US012148352B2

(12) United States Patent
Li et al.

(10) Patent No.: US 12,148,352 B2
(45) Date of Patent: Nov. 19, 2024

(54) DISPLAY DEVICE AND CONTROL METHOD THEREOF

(71) Applicant: Shenzhen China Star Optoelectronics Semiconductor Display Technology Co., Ltd., Guangdong (CN)

(72) Inventors: Chengjie Li, Guangdong (CN); Wang Liu, Guangdong (CN); Jinao Chen, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/600,156

(22) PCT Filed: Sep. 8, 2021

(86) PCT No.: PCT/CN2021/117106

§ 371 (c)(1),
(2) Date: Sep. 30, 2021

(87) PCT Pub. No.: WO2022/252428

PCT Pub. Date: Dec. 8, 2022

(65) Prior Publication Data

US 2024/0029621 A1 Jan. 25, 2024

(30) Foreign Application Priority Data

May 31, 2021 (CN) ......................... 202110597212.2

(51) Int. Cl.
*G09G 3/20* (2006.01)

(52) U.S. Cl.
CPC ....... *G09G 3/2096* (2013.01); *G09G 2310/08* (2013.01); *G09G 2330/021* (2013.01)

(58) Field of Classification Search
CPC ............. G09G 3/2096; G09G 2310/08; G09G 2330/021; G09G 3/20
See application file for complete search history.

(56) References Cited

U.S. PATENT DOCUMENTS 11,114,012 B2 * 9/2021 Huang .................. G09G 5/006
2013/0238933 A1 9/2013 Shin
2020/0273416 A1 * 8/2020 Shan ..................... G09G 5/006

FOREIGN PATENT DOCUMENTS

CN 109410824 3/2019
CN 109509422 3/2019
CN 111477154 7/2020
CN 111477154 A * 7/2020 ............... G09G 3/20
CN 112785957 5/2021
CN 113284452 8/2021
WO WO-2020062551 A1 * 4/2020 ........... G09G 3/2096

* cited by examiner

*Primary Examiner* — Nitin Patel
*Assistant Examiner* — Karin Kiyabu

(57) ABSTRACT

The present disclosure discloses a display device and a control method thereof. The display device includes a system on board and a timing controller. The timing controller is configured to: disconnect a communication connection with the system on board when communication with the system on board is not required, and periodically output a check signal; and stop outputting the check signal when communication with the system on board is required, and establish a communication connection with the system on board after a delay of a preset duration.

14 Claims, 3 Drawing Sheets

DISPLAY DEVICE AND CONTROL METHOD THEREOF

RELATED APPLICATIONS

This application is a National Phase of PCT Patent Application No. PCT/CN2021/117106 having International filing date of Sep. 8, 2021, which claims the benefit of priority of Chinese Patent Application No. 202110597212.2 filed on May 31, 2021. The contents of the above applications are all incorporated by reference as if fully set forth herein in their entirety.

FIELD AND BACKGROUND OF THE INVENTION

The present disclosure relates to the field of display panel technologies, and in particular, to a display device and a control method thereof.

In a display device, as shown in FIG. 1, a timing controller (TCON) 12 periodically outputs a check signal to read data in a register, to detect whether a power management chip (Power Management IC, PMIC) 14 works normally. The timing controller 12 further transmits a data signal to a system on board 11. However, the data signal and the check signal are both transmitted through a serial bus 13. If the two signals are transmitted simultaneously, the two signals interfere or conflict with each other, leading to a check failure of the timing controller 12 or a communication failure between the timing controller 12 and the system on board 11.

SUMMARY OF THE INVENTION

Embodiments of the present disclosure provide a display device and a control method thereof, so that a check failure of a timing controller or a communication failure between a timing controller and a system on board can be avoided, thereby improving the reliability of the display device.

Embodiments of the present disclosure provide a display device, including a system on board and a timing controller.

The timing controller is configured to: disconnect a communication connection with the system on board when communication with the system on board is not required, and periodically output a check signal; and stop outputting the check signal when communication with the system on board is required, and establish a communication connection with the system on board after a delay of a preset duration.

Optionally, the display device further includes a switch module connected between the system on board and the timing controller by a serial bus; and the timing controller is further configured to: send a control signal to the switch module, and control a switch status of the switch module, to disconnect or establish a communication connection with the system on board.

Optionally, the timing controller is further configured to: control the switch module to be turned off when the control signal is at a low level, to disconnect a communication connection with the system on board; and control the switch module to be turned on when the control signal is at a high level, to establish a communication connection with the system on board.

Optionally, the timing controller includes a control terminal and a data transmission terminal; and the timing controller is further configured to: send the control signal to the switch module through the control terminal, disconnect or establish a communication connection with the system on board through the data transmission terminal.

Optionally, the switch module includes a transistor; and a gate of the transistor is connected to the control terminal of the timing controller, a drain of the transistor is connected to the system on board by the serial bus, and a source of the transistor is connected to the data transmission terminal of the timing controller by the serial bus.

Optionally, the timing controller includes a detection terminal; and the timing controller is further configured to: determine that communication with the system on board is not required when a low level signal is inputted at the detection terminal; and determine that communication with the system on board is required when a high level signal is inputted at the detection terminal.

Optionally, the display device further includes a power management module connected to the timing controller by a serial bus; and the power management module is configured to: read check data according to the check signal, and feed back the check data to the timing controller.

Optionally, the preset duration is greater than a duration between a moment at which the timing controller outputs the check signal to a moment at which the corresponding check data is received.

Optionally, the duration is 300 μs, and the preset duration is 500 μs.

Embodiments of the present disclosure further provide a control method of a display device. The display device includes a system on board and a timing controller, and the method includes:

disconnecting, by the timing controller, a communication connection with the system on board when communication with the system on board is not required, and periodically outputting a check signal; and stopping, by the timing controller, outputting the check signal when communication with the system on board is required, and establishing a communication connection with the system on board after a delay of a preset duration.

Optionally, the display device further includes a switch module connected between the system on board and the timing controller by a serial bus; and the method further includes:

sending, by the timing controller, a control signal to the switch module, and controlling a switch status of the switch module, to disconnect or establish a communication connection with the system on board.

Optionally, the controlling a switch status of the switch module, to disconnect or establish a communication connection with the system on board includes:

controlling the switch module to be turned off when the control signal is at a low level, to disconnect a communication connection with the system on board; and controlling the switch module to be turned on when the control signal is at a high level, to establish a communication connection with the system on board.

Optionally, the timing controller includes a detection terminal; and the method further includes:

determining, by the timing controller, that communication with the system on board is not required when a low level signal is inputted at the detection terminal; and determining, by the timing controller, that communication with the system on board is required when a high level signal is inputted at the detection terminal.

Optionally, the display device further includes a power management module connected to the timing controller by a serial bus; and the method further includes:

reading, by the power management module, check data according to the check signal, and feeding back the check data to the timing controller.

Optionally, the preset duration is greater than a duration between a moment at which the timing controller outputs the check signal to a moment at which the corresponding check data is received.

Optionally, the duration is 300 μs, and the preset duration is 500 μs.

The beneficial effects of the present disclosure are as follows: The timing controller disconnects a communication connection with the system on board when communication with the system on board is not required, to implement data check, and periodically outputs a check signal; and stops outputting the check signal when communication with the system on board is required, and establishes a communication connection with the system on board after a delay of a preset duration, to avoid the transmission of the check signal during communication between the timing controller and the system on board, avoid signal interference, and avoid a check failure of the timing controller or a communication failure between the timing controller and the system on board, thereby improving the reliability of the display device.

BRIEF DESCRIPTION OF THE SEVERAL VIEWS OF THE DRAWINGS

The following describes specific implementations of the present disclosure in detail with reference to the accompanying drawings, to make the technical solutions and other beneficial effects of the present disclosure obvious.

DESCRIPTION OF SPECIFIC EMBODIMENTS OF THE INVENTION

Figure 1:
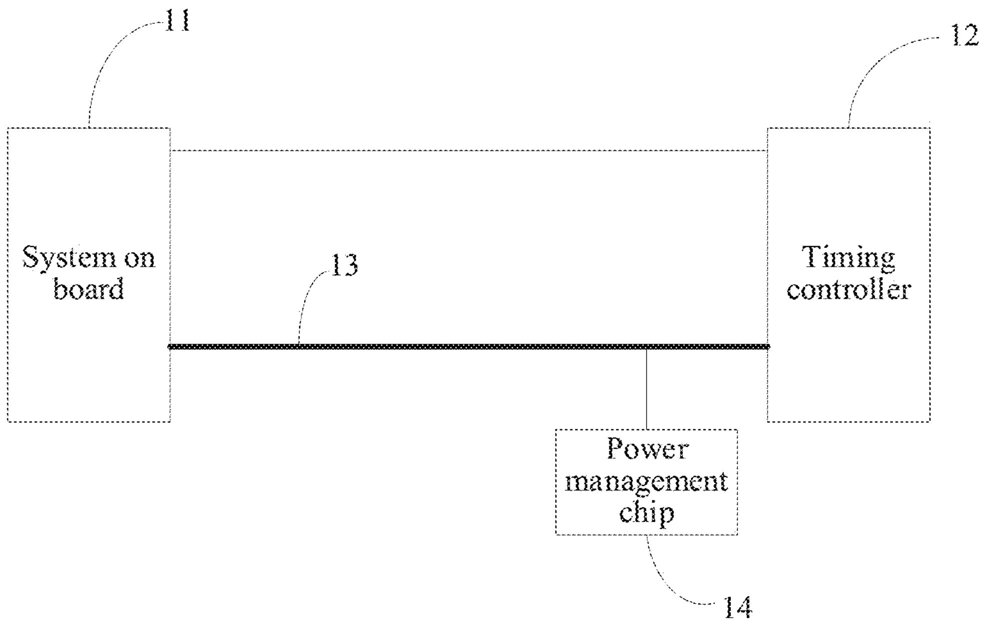
FIG. 1 Prior Art
FIG. 1 is a schematic diagram of a structure of a display device in the prior art.

Specific structures and functional details disclosed herein are merely representative, and are intended to describe the objectives of the exemplary embodiments of the present disclosure. However, the present disclosure may be specifically implemented in many alternative forms, and should not be construed as being limited to the embodiments set forth herein.

In the description of the present disclosure, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure. In addition, the terms "first" and "second" are used for descriptive purposes only and are not to be construed as indicating or implying relative importance or implicitly indicating the number of technical features indicated. Therefore, features defining "first" and "second" may explicitly or implicitly include one or more such features. In the description of the present disclosure, unless otherwise stated, "a plurality of" means two or more than two. In addition, the terms "include", "comprise" and any variant thereof are intended to cover non-exclusive inclusion.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

The terms used herein are for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, units, and/or components, but do not preclude the presence or addition of one or more other features, integers, steps, operations, units, components, and/or combinations thereof.

The present disclosure is further described below with reference to the accompanying drawings and embodiments.

Figure 2:
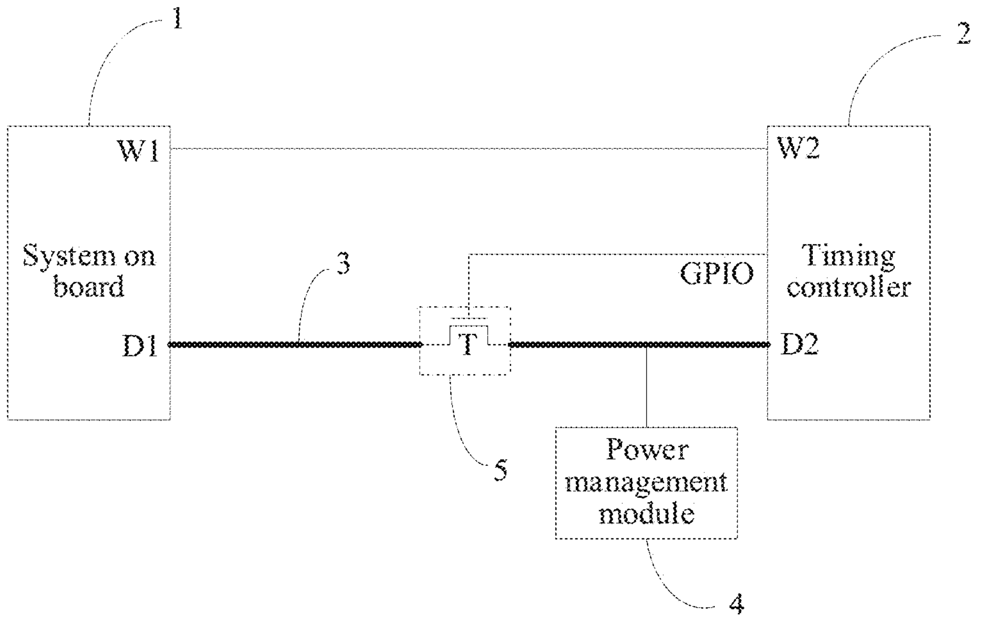
FIG. 2 is a schematic diagram of a structure of a display apparatus according to an embodiment of the present disclosure.

FIG. 2 is a schematic diagram of a structure of a display device according to an embodiment of the present invention;

Embodiments of the present invention provide a display device, including a system on board 1 and a timing controller 2. The timing controller 2 is configured to: disconnect a communication connection with the system on board 1 when communication with the system on board 1 is not required, and periodically output a check signal; and stop outputting the check signal when communication with the system on board 1 is required, and establish a communication connection with the system on board 1 after a delay of a preset duration.

The system on board 1 and the timing controller 2 are separately connected to a serial bus (I2C) 3. Specifically, the system on board 1 is provided with a data transmission terminal D1. The data transmission terminal D1 of the system on board 1 is connected to the serial bus 3. The timing controller 2 is provided with a data transmission terminal D2. The data transmission terminal D2 of the timing controller 2 is connected to the serial bus 3.

There is no real-time data transmission between the timing controller 2 and the system on board 1. There is data transmission between the timing controller 2 and the system on board 1 only when there is a demand on the system on board 1. For example, at different environmental temperatures or different display screen refresh rates, the system on board 1 requires the selection of different data (Over Drive tables) from the timing controller 2. There is data transmission between the timing controller 2 and the system on board 1 only in this period. When the timing controller 2 in the embodiments of the present disclosure performs data transmission with the system on board 1, a communication connection is established with the system on board 1. When the system on board 1 does not perform data transmission, a communication connection with the system on board 1 is disconnected.

Specifically, the timing controller 2 includes a detection terminal W2. The system on board 1 includes a signal terminal W1. The signal terminal W1 of the system on board 1 is connected to the detection terminal W2 of the timing controller 2. When the system on board 1 requires transmission of data with the timing controller 2, the system on board 1 first sends a high level signal to the detection terminal W2 of the timing controller 2 through the signal terminal W1. When detecting that a high level signal is inputted at the detection terminal W2, the timing controller 2 determines that the system on board 1 requires transmission of data, that is, determines that communication is required with the system on board. When the system on board 1 does not require transmission of data with the timing controller 2, the system on board 1 sends a low level signal to the detection terminal W2 of the timing controller 2 through the signal terminal W1. When detecting that a low level signal is inputted at the detection terminal W2, the timing controller 2 determines that the system on board 1 does not require transmission of data, that is, determines that communication is not required with the system on board.

When the timing controller 2 does not require communication with the system on board 1, it means that transmission of a data signal is not required between the data transmission terminal D2 of the timing controller 2 and the data transmission terminal D1 of the system on board 1. The timing controller 2 controls the serial bus 3 between the timing controller 2 and the system on board 1 to be disconnected, so that the connection between the data transmission terminal D2 of the timing controller 2 and the data transmission terminal D1 of the system on board 1 is disconnected. When the timing controller 2 does not require communication with the system on board 1, the timing controller 2 may periodically transmit the check signal through the serial bus 3, to implement periodic check. In this case, the check signal is periodically transmitted on the serial bus 3, and the data signal is not transmitted, to avoid signal interference, thereby ensuring normal check of the timing controller 2.

When the timing controller 2 requires communication with the system on board 1, it means that transmission of a data signal is required between the data transmission terminal D2 of the timing controller 2 and the data transmission terminal D1 of the system on board 1. The timing controller 2 controls the serial bus 3 between the timing controller 2 and the system on board 1 to be connected, so that the connection between the data transmission terminal D2 of the timing controller 2 and the data transmission terminal D1 of the system on board 1 is established. When the timing controller 2 requires communication with the system on board 1, the timing controller 2 stops transmitting the check signal through the serial bus 3, and implements the delay of the preset duration, to ensure that the last check before the transmission of the check signal is stopped can be completed. After the delay of the preset duration, the timing controller 2 establishes a communication connection with the system on board 1 through the serial bus 3, to enable the timing controller 2 and the system on board 1 to perform data transmission. In this case, the data signal is transmitted on the serial bus 3, and the check signal is not transmitted, to avoid signal interference, thereby ensuring normal communication between the timing controller 2 and the system on board.

Further, the display device further includes a switch module 5 connected between the system on board 1 and the timing controller 2 by the serial bus 3. The timing controller 2 is further configured to: send a control signal to the switch module 5, and control a switch status of the switch module 5, to disconnect or establish a communication connection with the system on board 1.

The switch module 5 is a serial bus switch. The data transmission terminal D1 of the system on board 1 is connected to the switch module 5. The data transmission terminal D2 of the timing controller 2 is connected to the switch module 5. The timing controller 2 may send the control signal to the switch module 5, and control the switch status of the switch module 5. The switch status includes a connected state or a disconnected state. Specifically, the control signal is at a high level, that is, the timing controller 2 sends a high-level control signal to the switch module 5 and controls the switch module 5 to be turned on, to enable the timing controller 2 to establish a communication connection with the system on board 1. The control signal is at a low level, that is, the timing controller 2 sends a low level control signal to the switch module 5 and controls the switch module 5 to be turned off, to enable the timing controller 2 and the system on board 1 to be disconnected.

Specifically, the timing controller 2 further includes a control terminal GPIO. The control terminal GPIO of the timing controller 2 is connected to the switch module 5. The timing controller 2 sends the control signal to the switch module 5 through the control terminal GPIO.

Specifically, as shown in FIG. 2, the switch module 5 includes a transistor T. A gate of the transistor T is connected to the control terminal GPIO of the timing controller 2. A drain of the transistor T is connected to the data transmission terminal D1 of the system on board 1 by the serial bus 3. A source of the transistor T is connected to the data transmission terminal D2 of the timing controller 2 by the serial bus 3. The timing controller 2 transmits a high-level control signal to the gate of the transistor T, and controls the transistor T to be turned on, that is, the switch module 5 to be turned on. The timing controller 2 transmits a low level control signal to the gate of the transistor T, and controls the transistor T to be turned off, that is, the switch module 5 to be turned off.

Further, the display device further includes a power management module 4 connected to the timing controller 2 by the serial bus 3. The power management module 4 is configured to: read check data according to the check signal, and feed back the check data to the timing controller.

The power management module 4 is connected to the data transmission terminal D2 of the timing controller 2 by the serial bus 3. When the timing controller 2 does not require communication with the system on board 1, the timing controller 2 periodically transmits the check signal to the power management module 4 through the data transmission terminal D2. Every time the power management module 4 receives one check signal, the power management module reads the check data from a memory according to the check signal, and feeds back the check data to the timing controller 2 through the serial bus 3. For example, the check signal may be a real time power management (RTPM) signal. After receiving the check data, the timing controller 2 detects whether the check data is correct. If the check data is correct, it indicates that the power management module 4 works normally. If the check data is not correct, it indicates that the power management module 4 works abnormally. The timing controller 2 rewrites correct registration data into a register of the power management module 4 again, to prevent a power anomaly from burning down an electronic element, thereby furthering preventing a hazard such as fire.

Because the serial bus 3 is required for transmission both when the timing controller 2 outputs the check signal and when the power management module 4 feeds back the check data, to avoid the transmission of a plurality of signals on the serial bus to avoid signal interference, when the timing controller 2 requires transmission of data with the system on board 1, the timing controller 2 stops outputting the check signal, and implements the delay of the preset duration. The preset duration is greater than a duration between a moment at which the timing controller 2 outputs the check signal and a moment at which the corresponding check data is received, thereby preventing the power management module 4 from feeding back the check data to the timing controller 2, to avoid interference with data transmitted between the timing controller 2 and the system on board 1. Therefore, the timing controller 2 implements the delay of the preset duration, to ensure that the timing controller 2 transmits data to the system on board 1 only after the check data corresponding to the latest check signal is received. Preferably, the duration is 300 μs, and the preset duration is 500 μs.

In summary, the timing controller in the embodiments of the present disclosure disconnects a communication connection with the system on board when communication with the system on board is not required, to implement data check, and periodically outputs a check signal; and stops outputting the check signal when communication with the system on board is required, and establishes a communication connection with the system on board after a delay of a preset duration, to avoid the transmission of the check signal during communication between the timing controller and the system on board, avoid signal interference, and avoid a check failure of the timing controller or a communication failure between the timing controller and the system on board, thereby improving the reliability of the display device.

Figure 3:
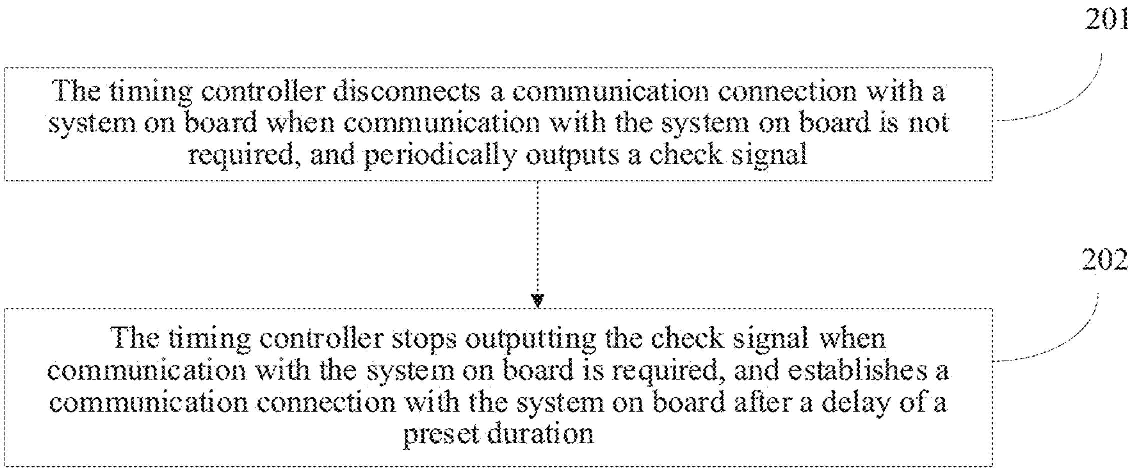
FIG. 3 is a schematic flowchart of a control method of a display device according to an embodiment of the present disclosure.

Embodiments of the present disclosure further provide a control method of a display device. The display device includes a system on board and a timing controller. As shown in FIG. 3, the method includes the following steps.

201: The timing controller disconnects a communication connection with the system on board when communication with the system on board is not required, and periodically outputs a check signal.

202: The timing controller stops outputting the check signal when communication with the system on board is required, and establishes a communication connection with the system on board after a delay of a preset duration.

Optionally, the display device further includes a switch module connected between the system on board and the timing controller by a serial bus; and the method further includes:

sending, by the timing controller, a control signal to the switch module, and controlling a switch status of the switch module, to disconnect or establish a communication connection with the system on board.

Optionally, the controlling a switch status of the switch module, to disconnect or establish a communication connection with the system on board includes:

controlling the switch module to be turned off when the control signal is at a low level, to disconnect a communication connection with the system on board; and controlling the switch module to be turned on when the control signal is at a high level, to establish a communication connection with the system on board.

Optionally, the timing controller includes a detection terminal; and the method further includes:

determining, by the timing controller, that communication with the system on board is not required when a low level signal is inputted at the detection terminal; and determining, by the timing controller, that communication with the system on board is required when a high level signal is inputted at the detection terminal.

Optionally, the display device further includes a power management module connected to the timing controller by a serial bus; and the method further includes:

reading, by the power management module, check data according to the check signal, and feeding back the check data to the timing controller.

Optionally, the preset duration is greater than a duration between a moment at which the timing controller outputs the check signal to a moment at which the corresponding check data is received.

Optionally, the duration is 300 μs, and the preset duration is 500 μs.

Specifically, as shown in FIG. 1, the system on board 1 includes a signal terminal W1 and a data transmission terminal D1. The timing controller 2 includes a detection terminal W2, a control terminal GPIO, and a data transmission terminal D2. The display device further includes a switch module 5 and a power management module 4. The switch module 5 includes a transistor T. The signal terminal W1 of the system on board 1 is connected to the detection terminal W2 of the timing controller 2. The data transmission terminal D1 of the system on board 1 is connected to a drain of the transistor T. The control terminal GPIO of the timing controller 2 is connected to a gate of the transistor T. The data transmission terminal D2 of the timing controller 2 is connected to a source of the transistor T. The data transmission terminal D2 of the timing controller 2 is further connected to the power management module 4.

Figure 4:
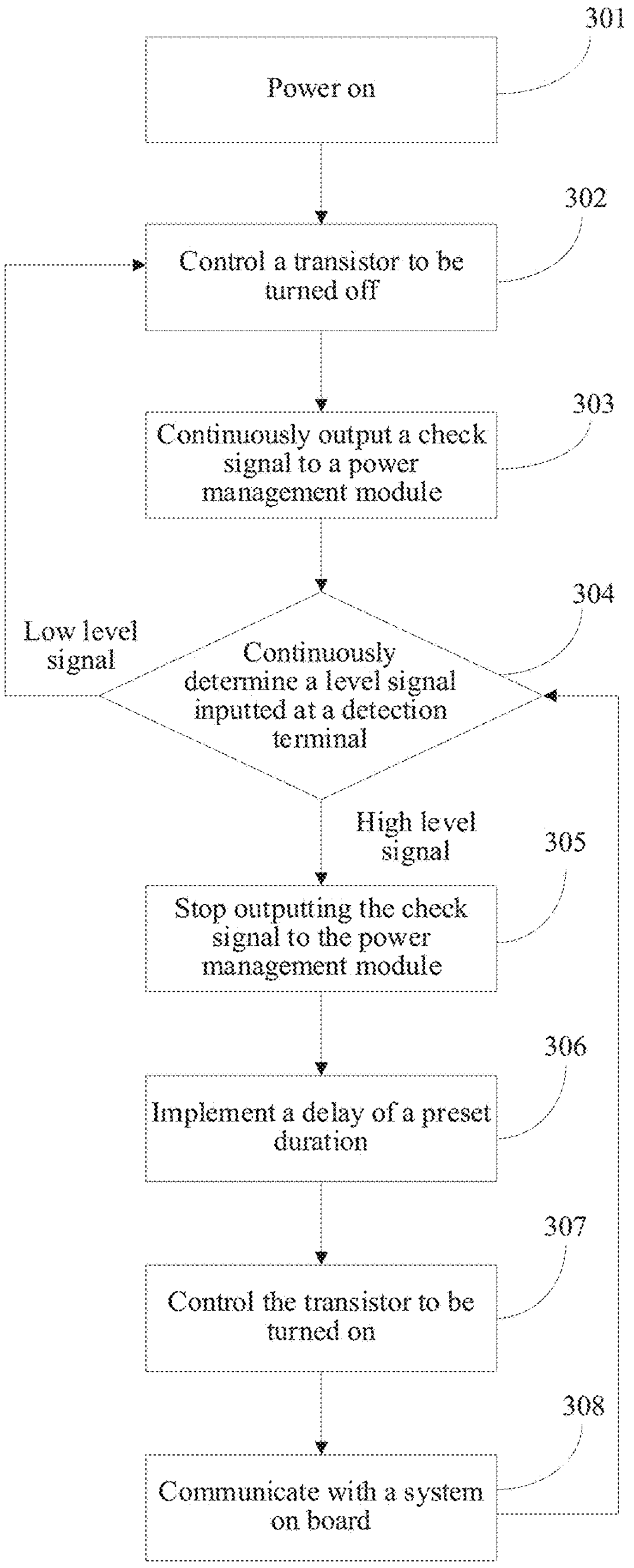
FIG. 4 is another schematic flowchart of a control method of a display device according to an embodiment of the present disclosure.

FIG. 4 is another schematic flowchart of a control method of a display device according to an embodiment of the present invention. As shown in FIG. 4, the method includes the following steps.

301: Power on.

The display device is powered on, so that a timing controller 2, a system on board 1, and a power management module 4 start working.

302: Control a transistor to be turned off.

After the display device is powered on, the timing controller 2 transmits a low level signal to a gate of the transistor T through a control terminal GPIO or does not output a signal. In this case, the transistor T is turned off, so that the connection between a data transmission terminal D1 of the system on board 1 and a data transmission terminal D2 of the timing controller 2 is disconnected.

303: Continuously output a check signal to a power management module.

The timing controller 2 periodically transmits the check signal to the power management module 4 (that is, one check signal is transmitted to the power management module 4 at an interval of a fixed duration) through the data transmission terminal D2. Every time the power management module 4 receives one check signal, check data is read from a register of the power management module, and is fed back to the power management module 4 through the data transmission terminal D2.

304: Continuously determine a level signal inputted at a detection terminal, if the level signal is a low level signal, return to step 302, or if the level signal is a high level signal, perform step 305.

When the system on board 1 does not require communication with the timing controller 2, the system on board 1 transmits a low level signal to the detection terminal W2 of the timing controller 2 through a signal terminal W1. When a low level signal is inputted at the detection terminal W2, the timing controller 2 transmits a low level signal to the gate of the transistor T through the control terminal GPIO or does not output a signal. In this case, the transistor T is turned off, so that the connection between the data transmission terminal D1 of the system on board 1 and the data transmission terminal D2 of the timing controller 2 is disconnected.

305: Stop outputting the check signal to the power management module.

When communication is required between the system on board 1 and the timing controller 2, the system on board 1 transmits a high level signal to the detection terminal W2 of the timing controller 2 through the signal terminal W1. When a high level signal is inputted at the detection terminal W2, the timing controller 2 stops periodically transmitting the check signal.

306: Implement a delay of a preset duration.

After the timing controller 2 stops periodically transmitting the check signal, the delay of the preset duration is implemented.

307: Control the transistor to be turned on.

After the delay of the preset duration, the timing controller 2 transmits a high level signal to a gate of the transistor through the control terminal GPIO, to turn on the transistor T.

308: Communicate with a system on board, and return to step 304.

After the transistor T is turned on, a connection is established between the data transmission terminal D1 of the system on board 1 and the data transmission terminal D2 of the timing controller 2. The system on board 1 may perform data transmission with the timing controller 2 through the data transmission terminal D1 and the data transmission terminal D2.

For example, when communication is not required between the system on board 1 and the timing controller 2, the data transmission terminal D2 of the timing controller 2 transmits the check signal to the power management module 4 at an interval of a duration T (for example, the timing controller 2 transmits the check signal to the power management module 4 at a moment T and a moment 2T). The system on board 1 requires communication with the timing controller 2 at a moment t1, $2T<t1<3T$, and the timing controller 2 stops transmitting the check signal. That is, at a moment 3T, the timing controller 2 no longer sends the check signal, and turns on the transistor T after the delay of the preset duration, to enable the system on board 1 and the timing controller 2 to establish a communication connection, to perform data transmission. The system on board 1 no longer requires communication with the timing controller 2 at a moment t2, $3T<t2<4T$, and the timing controller 2 controls the transistor T to be turned off, to disconnect a communication connection between the system on board 1 and the power management module 4. In addition, the timing controller 2 restores periodic transmission of the check signal to the power management module 4. That is, starting from a moment 4T, the timing controller transmits the check signal to the power management module at an interval of T.

The timing controller in the embodiments of the present disclosure disconnects a communication connection with the system on board when communication with the system on board is not required, to implement data check, and periodically outputs a check signal; and stops outputting the check signal when communication with the system on board is required, and establishes a communication connection with the system on board after a delay of a preset duration, to avoid the transmission of the check signal during communication between the timing controller and the system on board, avoid signal interference, and avoid a check failure of the timing controller or a communication failure between the timing controller and the system on board, thereby improving the reliability of the display device.

In conclusion, the present disclosure has been disclosed above through preferred embodiments. However, the preferred embodiments are not intended to limit the present disclosure, and a person of ordinary skill in the art can make various modifications and improvements without departing from the spirit and scope of the present disclosure. Therefore, the protection scope of the present disclosure should be subject to the scope defined by the claims.

What is claimed is:

1. A display device, comprising a system on board and a timing controller, wherein the timing controller is configured to: disconnect a communication connection with the system on board when communication with the system on board is not required, and periodically output a check signal; and stop outputting the check signal when communication with the system on board is required, and establish the communication connection with the system on board after a delay of a preset duration, the display device further comprises a switch device connected between the system on board and the timing controller by a serial bus, and the timing controller is further configured to: send a control signal to the switch device, and control a switch status of the switch device, to disconnect or establish the communication connection with the system on board.

2. The display device as claimed in claim 1, wherein the timing controller is further configured to: control the switch device to be turned off when the control signal is at a low level, to disconnect the communication connection with the system on board; and control the switch device to be turned on when the control signal is at a high level, to establish the communication connection with the system on board.

3. The display device as claimed in claim 1, wherein the timing controller comprises a control terminal and a data transmission terminal; and the timing controller is further configured to: send the control signal to the switch device through the control terminal, and disconnect or establish the communication connection with the system on board through the data transmission terminal.

4. The display device as claimed in claim 3, wherein the switch device comprises a transistor; and a gate of the transistor is connected to the control terminal of the timing controller, a drain of the transistor is connected to the system on board by the serial bus, and a source of the transistor is connected to the data transmission terminal of the timing controller by the serial bus.

5. The display device as claimed in claim 1, wherein the timing controller comprises a detection terminal; and the timing controller is further configured to: determine that the communication with the system on board is not required when a low level signal is inputted at the detection terminal; and determine that the communication with the system on board is required when a high level signal is inputted at the detection terminal.

6. The display device as claimed in claim 1, wherein the display device further comprises a power management circuit connected to the timing controller by the serial bus; and the power management circuit is configured to: read check data according to the check signal, and feed back the check data to the timing controller.

7. The display device as claimed in claim 6, wherein the preset duration is greater than a duration between a moment at which the timing controller outputs the check signal to a moment at which the check data is received.

8. The display device as claimed in claim 7, wherein the duration is 300 μs, and the preset duration is 500 μs.

9. A control method of a display device, wherein the display device comprises a system on board and a timing controller, and the method comprises:

disconnecting, by the timing controller, a communication connection with the system on board when communication with the system on board is not required, and periodically outputting a check signal; and stopping, by the timing controller, outputting the check signal when the communication with the system on board is required, and establishing the communication connection with the system on board after a delay of a preset duration, the display device further comprises a switch device connected between the system on board and the timing controller by a serial bus, and the method further comprises:

sending, by the timing controller, a control signal to the switch device, and controlling a switch status of the switch device, to disconnect or establish the communication connection with the system on board.

10. The control method of a display device as claimed in claim 9, wherein the controlling of the switch status of the switch device, to disconnect or establish the communication connection with the system on board comprises:

controlling the switch device to be turned off when the control signal is at a low level, to disconnect the communication connection with the system on board; and controlling the switch device to be turned on when the control signal is at a high level, to establish the communication connection with the system on board.

11. The control method of a display device as claimed in claim 9, wherein the timing controller comprises a detection terminal; and the method further comprises:

determining, by the timing controller, that the communication with the system on board is not required when a low level signal is inputted at the detection terminal; and determining, by the timing controller, that communication with the system on board is required when a high level signal is inputted at the detection terminal.

12. The control method of a display device as claimed in claim 9, wherein the display device further comprises a power management circuit connected to the timing controller by the serial bus; and the method further comprises:

reading, by the power management circuit, check data according to the check signal, and feeding back the check data to the timing controller.

13. The control method of a display device as claimed in claim 12, wherein the preset duration is greater than a duration between a moment at which the timing controller outputs the check signal to a moment at which the check data is received.

14. The control method of a display device as claimed in claim 13, wherein the duration is 300 μs, and the preset duration is 500 μs.

* * * * *